Nov. 21, 1972

J. L. AGNONE ET AL 3,703,585

D.C. SPUTTERING OF PARTICULATE POLYMERIC COMPOUNDS ONTO A SUBSTRATE

Filed June 24, 1970

JON C. SHEPPARD
JOHN L. AGNONE
ROBERT V. FISTER
INVENTORS

BY Walter O. Hodsdon
Henry M. Chapin
ATTORNEYS

United States Patent Office 3,703,585
Patented Nov. 21, 1972

1 2

3,703,585

D.C. SPUTTERING OF PARTICULATE POLYMERIC COMPOUNDS ONTO A SUBSTRATE

John L. Agnone, Rochester, Robert V. Fister, Hilton, and Jon C. Sheppard, Rochester, N.Y., assignors to Eastman Kodak Company, Rochester, N.Y.

Filed June 24, 1970, Ser. No. 49,468
Int. Cl. C23c *15/00*
U.S. Cl. 204—192 6 Claims

ABSTRACT OF THE DISCLOSURE

A polymeric material such as Teflon polytetrafluoroethylene (PTFE) is glow coated on a substrate inside a chamber by placing a thin layer of PTFE powder in a shallow tray constituting a cathode, and applying a D.C. potential between the cathode and an anode to sputter the polymeric material and form a thin film on the substrate. The substrate can be a part of the anode.

BACKGROUND OF THE INVENTION

Field of the invention

Figures 1, 2:
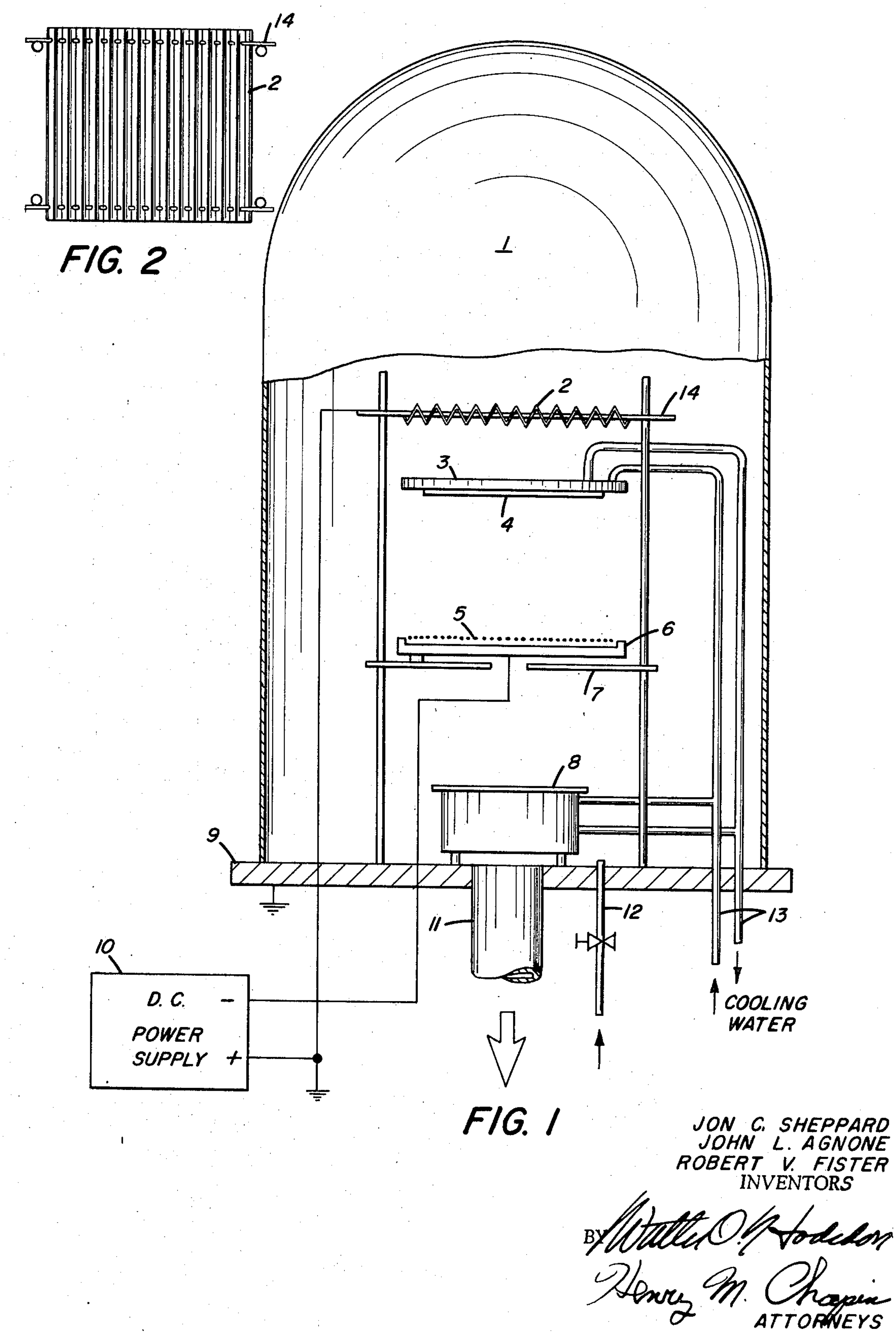

The present invention relates to a novel method of, and apparatus for the D.C. glow discharge sputtering of polymers onto a substrate, and also relates to a novel coated substrate produced by that method.

Description of the prior art

Polytetrafluoroethylene is a well known polymeric organic resin which has been used for coating various objects. It is generally available under the trademarks Teflon (Du Pont), Fluon, and Fluoroflex, and will be referred to hereinafter as PTFE for simplicity. Generally PTFE is sprayed onto an object and then heat treated to sinter. This procedure has been used in the past for coating metallic sealing elements which are used to heat seal plastic sheets together. The PTFE coating has been quite satisfactory but the useful life of such elements is not as long as is desired before they must be retreated or discarded.

U.S. Pat. 3,294,661 describes the coating of a substrate with a metal or an insulating film by R.F. sputtering, using a solid body of the material as a source to be dispersed. Among the insulating films mentioned is PTFE in the form of a sheet. Present technology claims that the D.C. mode of sputtering is not applicable to dielectrics.

A French Pat. 1,452,523 describes another technique for sputtering a coating material onto a substrate, but is primarily concerned with providing a mixture of elements such as silicon and lead which is placed in powder form on a cathode. This mixture of powders is then sputtered from the cathode to the substrate located on the anode. There is no suggestion that this technique could be used for sputtering a polymeric material such as PTFE.

SUMMARY OF THE INVENTION

We have provided a novel method for sputtering a polymeric material(s) onto a substrate which overcomes the drawbacks of the prior art described above. In our method we provide a chamber having a low pressure atmosphere therein, and also provide a cathode and anode in the chamber. A layer of unconsolidated pulverulent polymeric material is placed on the cathode and a direct current electric potential applied between the cathode and the anode to sputter the polymeric material from the layer of powder. A substrate to receive the coating is positioned at any desired locality within the chamber, preferably at a position between the anode and the cathode and within the area of glow. However, effective coating is obtained even when the substrate is outside the glow area. The substrate can be a metal piece such as steel, Nichrome, or aluminum, or it can be a non-metal such as glass or plastic. Pulsed or continuous D.C. can be used.

After a suitable length of time, such as one-half hour, the substrate can be removed from the chamber and employed for its intended purpose, such as for heat sealing plastics.

As an example of this process, if powdered PTFE is placed on the cathode the ratio of fluorine to carbon in the resultant coating is much different from that of the original PTFE. In Teflon PTFE powder on the cathode there are about 2 parts of fluorine by atomic ratio to 1 part of carbon, whereas the product on the substrate has about 1 part fluorine to 2 parts carbon. Nevertheless, the deposited layer has been found to be extremely satisfactory for its release characteristics and for long life when employed for heat sealing. For example, heat sealing bars coated with PTFE by conventional procedures give satisfactory production for approximately 500 hours, after which they must be removed and either discarded or retreated. Experiments have shown that heat sealing bars coated in accordance with our novel method have provided satisfactory heat sealing operations for more than 3,000 hours.

THE DRAWING

The principles of our invention will be described in more detail below with reference to the drawing, wherein:

FIG. 1 is a schematic side elevational view of novel sputtering apparatus for performing our novel method; and FIG. 2 is a plan view of a part of the apparatus of FIG. 1.

THE PREFERRED EMBODIMENTS

Referring to the drawing there is shown a glass bell jar or chamber 1 sealingly mounted on a base 9 to which are mounted conduits 11 for drawing a vacuum and 12 for supplying suitable gas to the interior of the chamber. A water-cooled baffle 8 is spaced above the inlet of conduit 11.

A horizontal metal cathode 6 near the bottom of the chamber is electrically coupled to the negative side of a direct current source 10. The cathode 6 such as one made of stainless steel, is formed as a shallow tray which is filled with a layer of polymeric powder 5 which is to be used as a source for sputtering onto a substrate, and is insulated from but supported by the glow shield 7 as by spaced legs of electrically insulating material. The layer should be one eighth inch or less in depth, because with deeper layers the coating operation barely works.

A horizontal substrate holder (anode) 3 is placed above the cathode 6 near the top of the chamber 1 and is connected to the positive terminal of the D.C. source 10, which is also connected to ground, through grounded conduits 13 and base plate 9. This substrate holder (anode) is supported by a pair of metal conduits 13 which serve to carry cooling water through the substrate holder (anode). The substrate 4, of metal or non-metal, which is to be sputter coated is located below the substrate holder (anode) 3 and supported in any desired way, as by adhesive, clips, staples, or wires. The substrate 4 is located in the glow area of the chamber 1 and between the two electrodes, but could also be located elsewhere.

We have found that with a minimum exposed anode surface it is not possible to maintain optimum sputtering action for extended periods of time. This results from the coating of all exposed non-cathodic surfaces with the dielectric material. In order to overcome this, we have provided the secondary anode 2 having a series of thin, folded, rolled or crinkled metal sheets of very much greater surface area than the substrate holder (anode) 3. For example, accordion pleated aluminum sheet can be mounted on a supporting frame 14 above anode 3. This construction permits maintaining the glow for a long enough time to provide a heavier coating on the substrate.

In the operation of the apparatus described above the chamber 1 is first evacuated through conduit 11 until a vacuum such as approximately $1\times10^{-4}$ torr is obtained to purge the chamber. Then a small quantity of an inert gas such as argon or nitrogen is introduced through conduit 12 and the electrical energy is applied to the system from a D.C. source 10 such as a rectifier. In a short time the glow between the electrodes becomes visible and the sputtering of the material from the cathode 6 commences. Once the glow has been established, the flow of inert gas is discontinued and the glow is sustained by the products of the sputtering of the powder without further introduction of any inert gas. We have obtained successful coatings by operation for about one-half hour at a voltage of 1,000 to 1,500 volts D.C. and with a current up to 0.1 ampere. Success has been achieved with ⅛-inch maximum thickness of PTFE powder in a 7½" diameter circular cathode 6, and with the substrate 5" above the cathode 6.

We have shown the substrate 4 positioned between the electrodes, but we have found that it can be coated anywhere within the chamber 1, although with somewhat reduced coating rates. This is an advantage over the R.F. coating procedures which require that a substrate be located within the glow area between the electrodes.

The Teflon PTFE powder used was extremely fine and soft, with the basic powder size being on the order of microns. However, the basic powder particles tend to agglomerate so that the apparent powder size is much greater. Some conglomerates appear to be as large as 1/32" in diameter, but vary down to much smaller conglomerate particles. The term powder has been used herein to distinguish from the well known consolidated form of sheet or flake which we have found to be inoperative in our method, probably because they form a solid dielectric layer on the cathode. Suitable Teflon PTFE powder is marketed by E. I. du Pont as molding powder composition #1.

In general, Teflon PTFE is made up of long chains of $CF_2$ units having a structural formula:

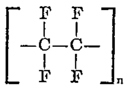

wherein *n* is about 1000. U.S. patents describing this material are as follows: 2,330,654, 2,393,967, 2,394,243, 2,534,058.

The sputtered coating produced from the above PTFE material was found to have improved adhesion, hardness and wear resistance with satisfactory solvent resistance, dielectric strength, release properties and freedom from film discontinuities.

The invention has been described in detail with particular reference to preferred embodiments thereof, but it will be understood that variations and modifications can be effected within the spirit and scope of the invention.

We claim:

1. A method for applying a thin film of polymeric organic resin material on a substrate which comprises:
providing a chamber having a low subatmospheric pressure atmosphere therein;
providing a cathode in said chamber;
providing a layer of unconsolidated pulverulent polymeric organic resin on said cathode, said layer being one-eighth inch or less in depth;
providing an anode in said chamber;
positioning a substrate in said chamber; and
applying a direct current electric potential between said cathode and said anode to sputter said polymeric material and form a thin film on said substrate.

2. A method in accordance with claim 1 wherein the electric potential is of the order of 1000 to 1500 volts D.C. or pulsed D.C., with a 7½ inch diameter cathode and cathode-to-anode distance of 5 inches.

3. A method in accordance with claim 1 also comprising, before applying said electric potential, drawing a vacuum in said chamber and then introducing a small quantity of inert gas therein; and after applying said electric potential and initiating a glow discharge; discontinuing the flow of inert gas into said chamber while glow discharge is maintained.

4. A method in accordance with claim 1 wherein said polymer is polytetrafluoroethylene.

5. A method in accordance with claim 1 wherein said unconsolidated pulverulent polymeric organic resin has a basic powder size on the order of microns but has some agglomerates of powder up to as large as about 1/32" in diameter.

6. A method in accordance with claim 5 wherein said organic resin is polytetrafluoroethylene.

References Cited

UNITED STATES PATENTS 3,562,140 2/1971 Skinner et al. ........ 204—298

FOREIGN PATENTS 851,880 10/1960 Great Britain ........ 204—192

OTHER REFERENCES

Akishin et al.: "Atomisation of Polymers by Argon, Helium and Hydrogen Ions With Energies up to 30 kev.," R. J. of Phys. Chem., December 1965, p. 1637.

JOHN H. MACK, Primary Examiner
S. S. KANTER, Assistant Examiner

U.S. Cl. X.R.

204—298